Feb. 16, 1937. A. D. DOWD Re. 20,265

TELEGRAPH CIRCUIT

Original Filed Jan. 26, 1933 2 Sheets-Sheet 1

INVENTOR
A. D. DOWD
BY J. W. Schmied
ATTORNEY

Feb. 16, 1937. A. D. DOWD Re. 20,265

TELEGRAPH CIRCUIT

Original Filed Jan. 26, 1933 2 Sheets-Sheet 2

INVENTOR
A. D. DOWD
BY J. W. Schmied
ATTORNEY

Reissued Feb. 16, 1937

Re. 20,265

UNITED STATES PATENT OFFICE 20,265

TELEGRAPH CIRCUIT

Andrew D. Dowd, Montclair, N. J., assignor to Bell Telephone Laboratories, Incorporated, New York, N. Y., a corporation of New York Original No. 1,959,412, dated May 22, 1934, Serial No. 653,657, January 26, 1933. Application for reissue November 21, 1935, Serial No. 50,922

5 Claims. (Cl. 178—58)

The present invention relates to telegraph systems and more particularly to such systems in which telegraph apparatus is to be operated in a loop circuit extending from a central exchange station.

In telegraph exchange service, such as has been established for teletypewriter operation, each subscriber is connected to the nearest teletypewriter exchange by means of a cable or open-wire circuit commonly known as a subscriber's loop. Since subscribers are located at various distances from the exchange the loops are of different lengths and have different amounts of distributed capacity and resistance.

Whenever communication is established between two subscribers who are connected to a particular telegraph exchange, or between two or more subscribers connected to different telegraph exchanges, a telegraph repeater is employed in a cord circuit at each exchange. The repeaters of the cord circuits of these telegraph exchange stations are substantially the same and utilize the principle of duplex balance and employ fixed balancing networks. For satisfactory operation of the system, it is necessary that both the transmission characteristics and the impedance characteristics of the various loops connected to the telegraph exchange station be as near alike as possible.

In the past, the total direct current resistance of the loops has usually been equalized by so-called limiting resistances located at the telegraph exchange station. Although this usually results in a uniform loop impedance for a direct current, the impedance and transmission characteristics of the loop circuit over the frequency range employed in direct current telegraphy will not be uniform but will vary from one loop circuit to another in a manner depending upon the values of the total distributed capacity and resistance as well as upon the values of the various resistance and inductance elements which have been connected into the circuit.

A disadvantage of this arrangement is that the wave shape of the signals as received at the exchange station and repeated to the other subscriber's station is distorted and unsatisfactory due to distortion and bias resulting from the different transmission characteristics of the various loop circuits.

A limit has been found to apply to the length of loop beyond which the printing telegraph apparatus inserted in the loop circuit ceases to operate efficiently.

Furthermore, it has not been found practical heretofore to design repeaters with simple balancing networks which are satisfactory for use between loop circuits having little or no capacity and cable circuits having up to about twenty-five geographical miles of 19 gauge cable. For loop circuits containing the longer lengths of cable, the duplex balance has been found to be unsatisfactory when using existing types of balancing networks. Beyond this limit, there was found to exist a certain amount of unbalance between the duplex balance circuit and the loop circuit. This unbalance frequently causes false operation of the polarized relay inserted at the exchange station, which transmits short spacing signals back to the sending loop circuit and thus interferes with the transmission of signals to the receiving loop circuit.

It is an object of this invention to so modify the impedance and transmission characteristics of the various loop circuits so that the transmission characteristics will be improved and the duplex balance maintained satisfactory even with cables whose length may be considerably increased, whereby the above-mentioned disadvantages are minimized.

In pursuance of this object, it is proposed to rearrange the direct current loop limiting resistance referred to above, for example, by concentrating at least a portion of it at a point located near the subscriber's station or by placing a portion of the resistance at the subscriber's end and dividing the other portion into two parts and placing one of these parts in the tip lead and the other part in the ring lead of the loop circuit at the central office and finally by experimentally selecting such values of resistance that first, false operation of the relay in the cord circuit repeater is prevented, and second, the wave shape of the signal currents received will be improved.

The principles of the invention will now be described in detail in connection with the accompanying drawings in which.

Figure 1:
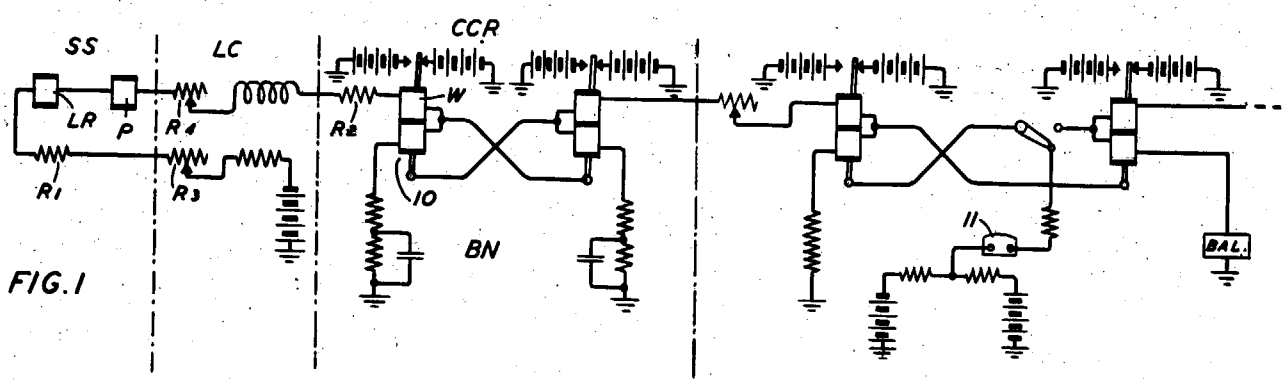
Fig. 1 shows a diagrammatic circuit arrangement used for making telegraph impulse transmission tests for the purpose of studying the effect of the distribution of resistance upon the distortion or bias of telegraph signals.

Fig. 1 shows a diagram of a bias testing circuit including a subscriber's station SS, a loop or line circuit LC (including twelve miles of 19 gauge cable and signaling and supervisory equipment), and a cord circuit repeater CCR. In this circuit all the loop current limiting resistance was placed in the position shown by resistance elements R2 in the repeater branch of the loop circuit. For 48-volt battery operation with a line current of 0.020 ampere, the resistance of R2 had such a value that the total circuit resistance was about 4800 ohms. In studying the effect which distribution of the resistance of the circuit would have upon the form of the wave shape of the signals transmitted, the loop circuit was alternately opened and closed at the transmitter of the subscriber's station SS and the bias measured by the bias measuring device 11. The values thus obtained are plotted in curve C of Fig. 3 which indicates that in the absence of a special resistance element at the subscriber's station the bias of the impulses transmitted from the subscriber's station reaches the high value of about 21% for a subscriber's loop having a length of 12 miles of 19 gauge cable.

The loop current limiting resistance was then divided into two portions, one of which was moved from the central office to the subscriber's station where it was connected in series with the line relay LR of the printer P in the position shown by resistance R1 in Fig. 1. It was found that with this arrangement of the resistances, the signal distortion was reduced to the values shown on curve C1 of Fig. 3.

Figure 3:
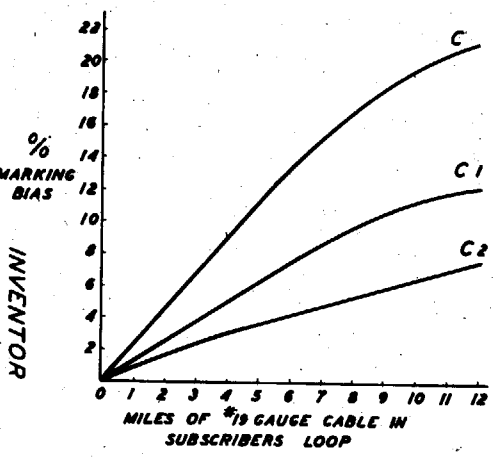

Next, the remaining part of the resistance R2 was divided into two unequal parts; the larger part was moved to point R1 while the smaller part remained in position R2 of Fig. 1. In this manner practically all the resistance was concentrated at the subscriber's station. Curve C2 of Fig. 3 shows the resulting improvement in the bias of the impulses transmitted from the subscriber's station.

These tests tend to show that all other factors remaining the same, the lower the resistance R2 in the repeater branch, the higher the efficiency of the transmission from the subscriber. It was ascertained, however, that this resistance could not be reduced much below a certain value (about 1400 ohms) for the reason that the current surges through the winding W of relay 10 of the repeater when signals are transmitted in the reverse direction, that is, from the repeater located at the exchange station to the subscriber's station, causes the operation of relay 10 in all cases in which the loop circuit contains a cable longer than about twelve miles. This irregularity in the operation of the relay was due to the use of a fixed balancing network BN of a fixed compromise value which was intended to balance all loop circuits of ordinary length. The false operation of relay 10 was substantially prevented by limiting the minimum value of resistance R2 to 1400 ohms.

Resistance R2 may be further divided into a fixed and a variable portion, the fixed portion remaining in the position shown by resistance R2 and the variable portion being positioned in the opposite loop conductor next to the battery.

Figure 2:
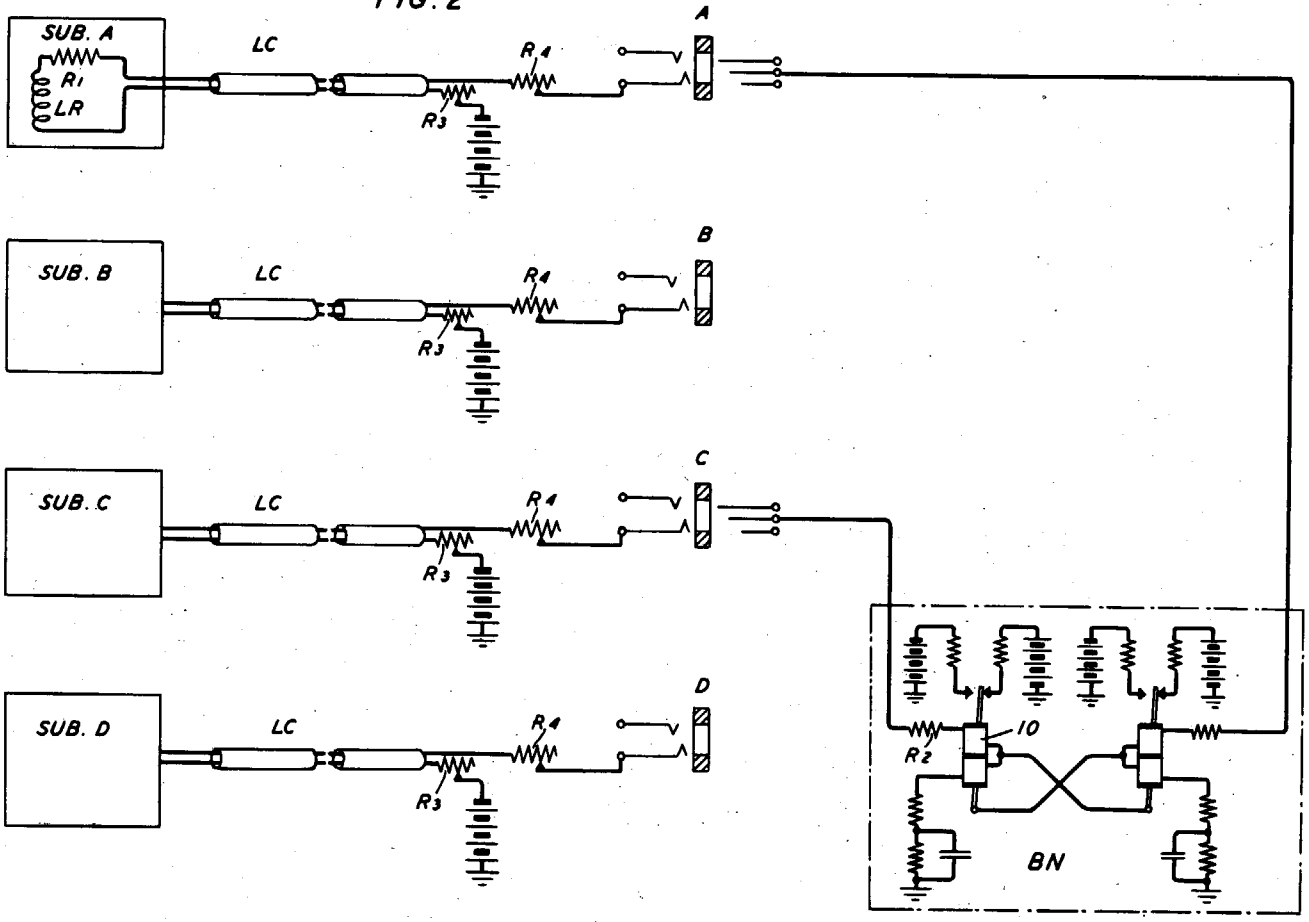
Fig. 2 is a circuit diagram representing a practical embodiment of the invention.

Fig. 2 shows several examples of the final disposition of the various resistances. In this figure, resistance R1 is again at the subscriber's station, resistance R4 corresponds to R2 in Fig. 1, resistance R3 is a variable part located in the opposite conductor while resistance R2 is located in the repeater circuit and is provided for signaling, supervisory, and monitoring purposes. It is to be understood that resistances R1, R3 and R4 include the resistance of windings of various other supervisory and signaling apparatus that may be connected in series with them. It is also to be noted that the combined resistance of resistances R2 and R4 and the resistance of windings connected directly in series with them should be considered as being a part of the minimum resistance of 1400 ohms in the repeater side of the loop circuit.

Although the use of a resistance element R1 of a value of 1600 ohms in addition to the resistance of about 178 ohms of windings of relays P and LR at the subscriber's station resulted in a satisfactory transmission over cables of a length of about twelve miles, the transmission was still further improved as the resistance R1 was increased to 2500 ohms.

Figure 4:
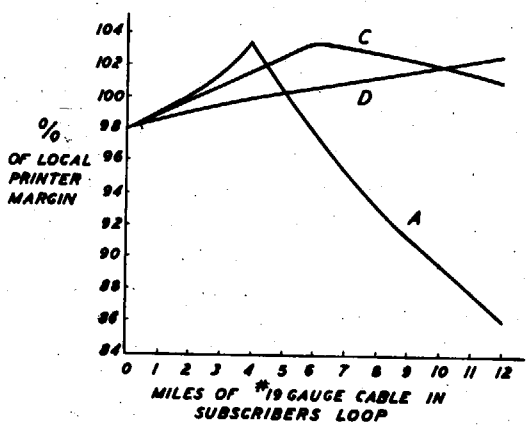
Figs. 3 and 4 represent curves illustrative of comparative tests made on the circuits shown in Figs. 1 and 2.

The curves of Fig. 4 graphically depict the results of the practical application of the findings of the tests described above to printing telegraph circuits and apparatus such as those shown in Fig. 2.

Curve A of Fig. 4 depicts the percentage reduction of the printer margins for a teletypewriter transmitting signals from a subscriber's station over an ordinary loop circuit into a cord circuit repeater and then over 300 miles open wire line section in the absence of the provision of any special resistance at the subscriber's station. It is seen that the values of printer margins begin to become poor for loop lengths as low as 4 to 5 miles.

Curve C of the same figure corresponds to a printing telegraph apparatus transmitting signals from a subscriber's station over a loop circuit including a resistance element of 1600 ohms at the subscriber's station, into a cord circuit repeater and then over 300 miles of open wire line. The improvement is very noticeable.

Curve D of Fig. 4 also depicts the improved results obtained when transmitting signals from a subscriber's station over a loop circuit including a resistance element of 1600 ohms at the subscriber's station through a cord circuit repeater into a cord circuit repeater and then over 300 miles of open wire line.

The trend of curves C and D indicates that the length of the cable comprised in the loop circuit may be safely increased considerably beyond the value of 12 miles to which the tests were limited.

The improvements contemplated by this invention are of importance in modern teletypewriter exchange service, not only since they increase the efficiency of existing circuits by enabling the correct transmission of telegraph messages over cable circuits of greatly increased length (up to about 35 miles), but also since they permit a reduction in the number of telegraph exchanges and repeater stations necessary to cover a given territory without the use of expensive long line equipment upon subscribers' loops.

What is claimed is:

1. In a telegraph circuit comprising a subscriber's loop circuit, a repeater station, a duplex balance circuit and current limiting resistance connected in said loop circuit, the method of increasing the length of the loop over which telegraph signals may be received free from such distortion as would interfere with their correct recording by printing telegraph apparatus, which comprises locating the greater portion of said current limiting resistance at a point near the subscriber's station.

2. In a telegraph system, a telegraph transmitter, a telegraph repeater, a plurality of telegraph circuits of different impedance characteristics, means for connecting said repeater to said telegraph circuits for repeating signals between said circuits, a balancing network for said repeater, said balancing network being capable of balancing the impedance characteristics of a substantial portion of said plurality of circuits, and an electric network including a resistance element in each of the remainder of said plurality of circuits, whereby unbalance effects caused by the impedance characteristics of the remainder of said circuits are reduced.

3. A telegraph exchange system having a plurality of subscribers' loops of varying electrical length and without intermediate repeaters, a central office including devices interchangeably connectable with said loops for telegraphic transmission thereover, equalizing resistances in at least certain of said loops for rendering their impedance more nearly similar to that of other loops, characterized in this that a substantial portion of the equalizing resistance in any loop is located near each end thereof.

4. A telegraph exchange system in accordance with claim 3 in which the total resistance at the exchange end of any loop is divided into two parts, one of which is placed in each conductor of the loop.

5. A system in accordance with claim 3 in which the said devices at the central office include two-way telegraph repeaters.

ANDREW D. DOWD.